United States Patent
Wang et al.

(10) Patent No.: US 11,726,829 B2
(45) Date of Patent: **\*Aug. 15, 2023**

(54) ADAPTIVE, PERFORMANCE-ORIENTED, AND COMPRESSION-ASSISTED ENCRYPTION SCHEME

(71) Applicant: NICIRA, INC., Palo Alto, CA (US)

(72) Inventors: Dexiang Wang, Palo Alto, CA (US); Calvin Qian, Palo Alto, CA (US); Dan Wing, Palo Alto, CA (US); Gang Xu, Palo Alto, CA (US); Bin Zan, Palo Alto, CA (US)

(73) Assignee: Nicira, Inc., Palo Alto, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/011,465

(22) Filed: Sep. 3, 2020

(65) Prior Publication Data

US 2021/0124622 A1    Apr. 29, 2021

Related U.S. Application Data

(63) Continuation of application No. 15/721,495, filed on Sep. 29, 2017, now Pat. No. 10,768,993.

(51) Int. Cl.
*G06F 21/00* (2013.01)
*G06F 9/50* (2006.01)
(Continued)

(52) U.S. Cl.
CPC .......... *G06F 9/5061* (2013.01); *G06F 21/602* (2013.01); *G06N 5/022* (2013.01)

(58) Field of Classification Search
CPC ...... G06F 9/5061; G06F 21/602; G06N 5/022
See application file for complete search history.

(56) References Cited

U.S. PATENT DOCUMENTS 7,254,234 B2 * 8/2007 Sugahara ............. H04L 9/0861
380/37
7,420,992 B1    9/2008 Fang et al.
(Continued)

FOREIGN PATENT DOCUMENTS

| CN | 1503504 A | * | 6/2004 | ........... H04L 9/0891 |
| CN | 106797463 A | * | 5/2017 | ............... G06K 9/03 |
| GB | 2405025 A | * | 2/2005 | ....... G11B 20/00086 |

OTHER PUBLICATIONS

S. Kent, Network Working Group, Standards Track, entitled "IP Encapsulating Security Payload (ESP)", Dec. 2005 (44 pgs.).
(Continued)

*Primary Examiner* — Mahfuzur Rahman
(74) *Attorney, Agent, or Firm* — Barta, Jones & Foley, PLLC

(57) ABSTRACT

An approach for an adaptive, performance-oriented, and compression-assisted encryption scheme implemented on a host computer to adaptively improve utilization of CPU resources is provided. The method comprises queueing a new data packet and determining a size of the new data packet. Based on historical data, a plurality of already encrypted data packets is determined. Based on information stored for the plurality of already encrypted data packets, an average ratio of compression for the plurality of already encrypted data packets is determined. Based on the average ratio of compression, a throughput of compression value and a throughput of encryption value, a prediction whether compressing the new data packet will reduce a CPU load is derived. If it is determined that compressing the new data packet will improve utilization of the CPU resources, then a compressed new data packet is generated by compressing the new data packet.

20 Claims, 7 Drawing Sheets

(51) Int. Cl.
  *G06F 21/60* (2013.01)
  *G06N 5/022* (2023.01)

(56) References Cited

U.S. PATENT DOCUMENTS

| | | | | |
|---|---|---|---|---|
| 9,385,749 | B1* | 7/2016 | Nam | H03M 7/607 |
| 2003/0105800 | A1* | 6/2003 | Cullen | H04L 67/10 |
| | | | | 709/201 |
| 2005/0086383 | A1 | 4/2005 | Le | |
| 2010/0325268 | A1 | 12/2010 | Muthiah et al. | |
| 2013/0144906 | A1* | 6/2013 | Bhupalam | H04L 65/612 |
| | | | | 707/E17.014 |
| 2013/0144979 | A1* | 6/2013 | Kansal | H04N 21/2402 |
| | | | | 709/219 |
| 2013/0167181 | A1* | 6/2013 | Dixit | H04L 65/762 |
| | | | | 725/95 |
| 2013/0191649 | A1* | 7/2013 | Muff | G06F 12/1408 |
| | | | | 707/693 |
| 2013/0191651 | A1* | 7/2013 | Muff | G06F 12/1027 |
| | | | | 713/193 |
| 2014/0137119 | A1* | 5/2014 | Hyde | G06F 21/56 |
| | | | | 718/100 |
| 2014/0161171 | A1 | 6/2014 | Venkatachalam Jayaraman et al. | |
| 2014/0304428 | A1 | 10/2014 | Fischer-Toubol et al. | |
| 2015/0215625 | A1 | 7/2015 | Huang et al. | |
| 2016/0028544 | A1* | 1/2016 | Hyde | H04L 9/085 |
| | | | | 711/112 |
| 2016/0155470 | A1* | 6/2016 | Toma | H04N 21/4825 |
| | | | | 386/355 |
| 2016/0350021 | A1 | 12/2016 | Matsushita et al. | |
| 2016/0378614 | A1* | 12/2016 | Thanasekaran | G06F 11/1458 |
| | | | | 707/652 |
| 2017/0111233 | A1* | 4/2017 | Kokkula | H04L 43/08 |
| 2018/0014082 | A1* | 1/2018 | Daily | H04L 69/16 |
| 2018/0103018 | A1 | 4/2018 | Chauhan et al. | |
| 2018/0198765 | A1* | 7/2018 | Maybee | H04L 67/1095 |
| 2019/0014055 | A1* | 1/2019 | Gupta | H04L 49/9084 |
| 2019/0065788 | A1 | 2/2019 | Kiron et al. | |
| 2020/0057669 | A1* | 2/2020 | Hutcheson | G06F 3/0664 |

OTHER PUBLICATIONS

A.Shacham Juniper Network Working Group, Standards Track, entitled IP Payload Compression Protocol (IPComp), Sep. 2001, (13 pgs.).

John P. McGregor, entitled "Performance Impact of Data Compression on Virtual Private Network Transactions" © 2000 IEEE (11 pp. 500-510).

* cited by examiner

With Flow Classification

Without Flow Classification

FIG. 7

710 Assumptions:
- X represents a ratio of compression. Generally, $0<X<1$. However, $X>1$ for certain data packets and for certain compression algorithms.
- S denotes an original packet size.
- S' denotes a compressed packet size.
- Tc denotes a throughput of compression. Generally, Tc depends at least on a packet size and entropy density characteristics carried in the packet.
- Te denotes a throughput of encryption. Generally, Te depends on a packet size.
- Lc denotes a CPU load on encryption of the original packet. Le = S/Te.
- Lc denotes a CPU load on compression of the original packet. Lc = S/Tc.
- Le' denotes a CPU load on encryption of the compressed packet. Le' = S'/Te.

720 Objectives:
Determine whether a CPU load of compression + encryption < CPU load of encryption only (no compression)
This may be denoted as: determine whether Lc + Le' < Le 730 Problem Statement: Determining whether (Lc + Le' < Le) is difficult without actually compressing and then encrypting the data packet, and without actually encrypting the uncompressed data packet.

740 Solution: Instead of determining whether (Lc + Le' < Le), determine whether $T_c > T_e / (1-X)$ because:

Lc + Le' < Le (CPU load of compression+encryption < CPU load of encryption only)
=> S/Tc + S'/Te < S/Te
=> S/Tc < (S−S')/Te
=> Tc > Te*S/(S−S') (given that S'>S', when S<=S' we will not do compression due to lack of benefit)
=> Tc > Te/(1−X)

ADAPTIVE, PERFORMANCE-ORIENTED, AND COMPRESSION-ASSISTED ENCRYPTION SCHEME

CROSS-REFERENCE TO RELATED APPLICATIONS

This application is a continuation of U.S. patent application Ser. No. 15/721,495, filed Sep. 29, 2017, entitled "Adaptive, Performance-Oriented, and Compression-Assisted Encryption Scheme", the entirety of which is hereby incorporated by reference herein.

BACKGROUND

Encryption is a highly resource-demanding feature, especially if it is implemented in a Network Virtualization Security Platform (like NSX). Since performing data encryption is taxing on CPUs, performing encryption in an NSX environment puts additional demands on 1 CPU resources. One way to reduce the load on the CPUs is to reduce the size of data to be encrypted since the amount of the CPU resources required to encrypt a data packet is positively correlated to the size of the packet. One way to reduce the size of some data is to compress it.

Introducing compression before encryption in a data processing pipeline may reduce a size of the data, and thus help to conserve the CPU resources required for encryption. However, compressing data also places some demands on the CPU resources. Furthermore, compressing some data may not reduce its size at all. Thus, in some cases, overall CPU utilization will not be reduced and could actually be increased when combining compression with encryption.

However, in cases when data compression reduces a size of data, combining compression with encryption may not only reduce the load on the CPUs, but also increase the overall network throughput.

SUMMARY

In an embodiment, an approach allows predicting whether an overall load on CPUs to encrypt a packet could be reduced if the packet was first compressed and then encrypted. The prediction may be generated based on historical throughput data that may be specific to a data flow or a group of packets having roughly the same entropy.

In an embodiment, the approach allows predicting, without actually compressing and then encrypting the data packet, whether the CPU load to be used to encrypt an uncompressed packet could be reduced if the packet was compressed first and encrypted next.

BRIEF DESCRIPTION OF THE DRAWINGS

In the drawings:

FIG. 7 depicts an example algorithm for determining whether compressing a new data packet can cause reduction of a CPU load.

DETAILED DESCRIPTION

In the following description, for the purposes of explanation, numerous specific details are set forth in order to provide a thorough understanding of the presently described method. It will be apparent, however, that the present approach may be practiced without these specific details. In other instances, well-known structures and devices are shown in block diagram form to avoid unnecessarily obscuring the present approach.

Adaptive, Performance-Oriented, and Compression-Assisted Encryption System

Figure 1:
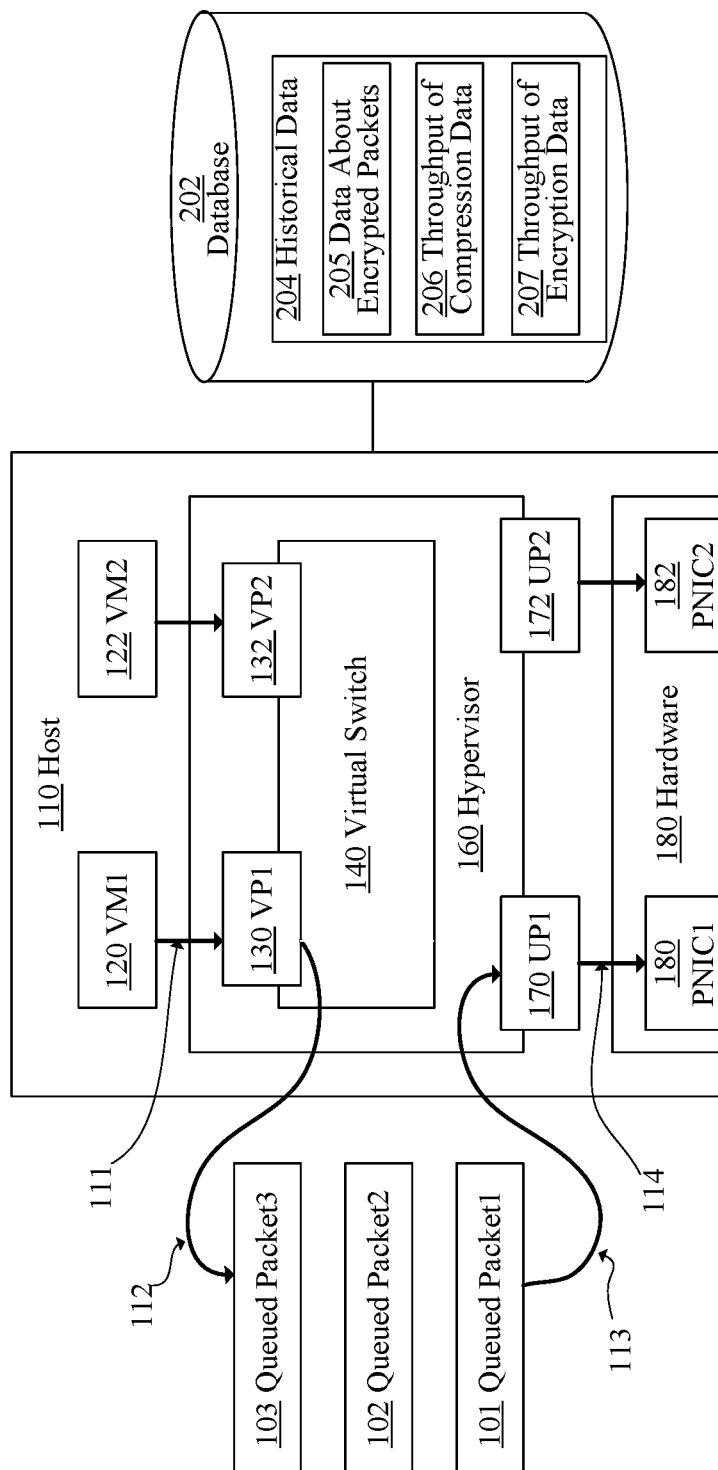
FIG. 1 is a block diagram depicting an example system architecture for an adaptive, performance-oriented, and compression-assisted encryption scheme.

FIG. 1 is a block diagram depicting an example system architecture for an adaptive, performance-oriented, and compression-assisted scheme. In the depicted example, the scheme is implemented on a host computer 110; however, other embodiments (not depicted in FIG. 1) may include multiple hosts and the hosts may be arranged in a variety of configurations.

Host 110 may include one or more virtual machines VM1 120, VM2 122, one or more virtual ports VP1 130, VP2 132, one or more uplinks UP1 170, UP2 172, a hypervisor 160, and hardware infrastructure 180. Other embodiments (not depicted in FIG. 1) may include additional elements and/or other arrangements of the elements.

Hypervisor 160 may be implemented as a software layer or a component that supports execution of multiple virtualized computing instances of virtual machines. In the depicted example, hypervisor 160 supports execution of VM1 120 and VM2 122, and supports communications to and from VMs 120-122.

Hypervisor 160 may be configured to implement an adaptive, performance-oriented, and compression-assisted encryption scheme. For example, hypervisor 160 may be configured to determine whether applying compression to a data packet before the packet is encrypted can reduce an overall load on the CPU. Specifically, hypervisor 160 may be configured to predict, without actually compressing and then encrypting the data packet, whether the CPU load can be reduced if the packet was compressed first, and encrypted second. For example, once data packets 101-103 are queued on any of the virtual ports VP1, VP2, hypervisor 160 may analyze the queued packets 101-103, and predict whether any of queued data packets 101-103 needs to be compressed before being encrypted. The packet flow is indicated using arrows 112-113.

Hypervisor 160 may further be configured to use historical data 204 to determine whether to compress a queued data packet before the packet is encrypted. Historical data 204 may include information 205 about the data packets that have been already compressed and then encrypted and about the data packets that have been already encrypted but not compressed. Historical data 204 may also include throughput of compression data 206, and throughput of encryption data 207. Historical data 204 may be stored in one or more databases 202 that are accessible to hypervisor 160. Non-limiting examples of historical data 204 are described in FIG. 2.

In an embodiment, hypervisor 160 includes a virtual switch 140. virtual switch 140 may be implemented as a kernel component of hypervisor 160, or as an entity that is separate from hypervisor 160 but that communicates with hypervisor 160. virtual switch 140 may be configured to monitor and manage data traffic that is communicated to and from hypervisor 160 and/or VMs supported by hypervisor 160.

Implementations of virtual switch 140 may vary and may depend on a type of product in which the virtual switch is deployed as a virtualization medium. For example, virtual switch 140 may be implemented as part of hypervisor 160, as it is depicted in FIG. 1, e.g., within the hypervisor kernel. Alternatively, although not depicted in FIG. 1, a virtual switch may be implemented as a separate hardware component, or as part of a user space, within a privileged virtual machine, sometimes referred to as Domain 0 (zero) or a "root partition."

virtual switch 140 may be configured to interface with virtual machines VM1 120 and VM2 122, and other virtual machines not depicted in FIG. 1.

Virtual machines 120-122, and potentially other virtual machines not depicted in FIG. 1, may be realized as complete computational environments, containing virtual equivalents of hardware and software components of the physical computing systems. Virtual machines 120-122 may be instantiated as virtualized computing instances. The instances may be equipped with their own resources, may be assigned their own workloads, and may be configured to perform their own tasks associated with the workloads. Virtual resources allocated to the virtual machines may include virtual CPUs, virtual memory, virtual disks, virtual network interface controllers and the like. Virtual machines 120-122 may be configured to execute guest operating systems and guest applications.

A virtualized computing instance may be realized as a hardware virtualization and/or a software virtualization. As a hardware virtualization, it may represent for example, an addressable data compute node. As a software virtualization, it may be used to provide for example, an isolated user space instance. Virtualized computing instances may include containers running on a top of the host operating system, virtual private servers, client computers, and hybrid combinations of thereof.

Hardware components 180 may include hardware processors, memory units, data storage units, and physical network interfaces, some of which are not depicted in FIG. 1. Hardware components 180 may also include for example, physical network interface controllers PNIC1 180 and PNIC2 182 that may provide connectivity to routers and switches of one or more physical networks.

Adaptive, Performance-Oriented, and Compression-Assisted Encryption Scheme

In an embodiment, an adaptive, performance-oriented, and compression-assisted encryption scheme allows predicting whether a CPU load can be reduced if a data packet is compressed before being encrypted. Packet compression algorithms are well known that compress payload segments of network packets (also referred to as "data packets") on a packet-by-packet basis—i.e., wherein each payload segment is individually compressed to reduce the overall size of the packet. The term, "packet data" will refer to payload data of a network packet. Generating such predictions is especially important because performing a compression of a data packet is usually strenuous on CPUs. However, if a compressed data packet is smaller in size than an original packet, then compressing plus encrypting the compressed data packet involves less of the CPU resources than encrypting the original packet. Thus, compressing the data packet in this situation may lower the load on the CPUs. On the other hand, if packet data is already compressed, then compressing the data packet may not cause decreasing the amount of the CPU resources required to encrypt the packet. For example, image data compressed using JPEG compression format may be spread across multiple packets and each of these packets will contain already-compressed packet data. There might be also a situation when a compressed data packet is larger in size than an original packet. In such cases, compressing the data packet and then encrypting the compressed packet puts more demands on the CPU load than if encryption was performed on the original packet without first compressing it.

An approach for predicting whether a CPU load can be reduced if a data packet is compressed before being encrypted may include determining entropy-based properties of the packet data. Generally, a data packet includes high-entropy information the packet data does not repeat any strings of values or has any discernable pattern. Examples of high entropy data include already compressed data, data that is already encrypted, or just random data. In contrast, a data packets includes low-entropy data if the packet data includes repeated strings of data such as is common in written text or code. The entropy-based properties of a data packet may be determined based on a type of the data flow to which the packet belongs.

A data packet may be analyzed to determine a type of the data flow to which the packet belongs, and the determined data flow type may be used to identify historical throughput data that is specific to that flow type and that may be used to determine whether to compress the packet. Non-limiting examples of different data flows include a VPN-type data flow, a VoIP-type data flow, HTTP-type data flow, and an NFS-type data flow.

Some data flows may contain high-entropy information. Such data flows may include already compressed data, such as MPEG data, JPEG data, ZIP data, DEFLATE data, and so forth. Such data flows may also include already encrypted PGP data, S/MIME data, WebCrypto data, TLS data, and so forth. Other data flows may contain low-entropy information. Such data flows may include ASCII plain text of HTML data, JavaScript data, and so forth.

For the duration of a typical data flow, if the flow starts with high-entropy data, then it usually persists with the high-entropy data. Similarly, for the duration of a typical data flow, if the flow starts with low-entropy data, then it usually persists with the low-entropy data.

However, sometimes data packets that belong to the same data flow may have different entropy-based properties. For example, on some occasions, a data flow that starts which high-entropy data may switch to low-entropy data. Therefore, it is possible that a single connection servicing such a data flow may keep switching back and forth between transmitting the data packets with high-entropy and the data packets with low-entropy. Non-limiting examples of such data flows include data packets communicated in with compliance with the HTTP/1.1 with pipelining and HTTP/2.

An approach for predicting whether a CPU load can be reduced if a data packet is compressed before being encrypted may include determining a type of the data compression algorithm and/or a type of the data encryption algorithm. For example, upon determining the type of the compression algorithm that is implemented in a system, and/or upon determining the type of the encryption algorithm that is implemented in the system, historical throughout data that is specific to the compression type and/or the encryption type may be used to generate the prediction. Examples of different data compression algorithms include a DEFLATE, LZS, and IPComp. Examples of data encryption algorithms include those used in conjunction with network encryption protocols such as IPsec.

Figure 2:
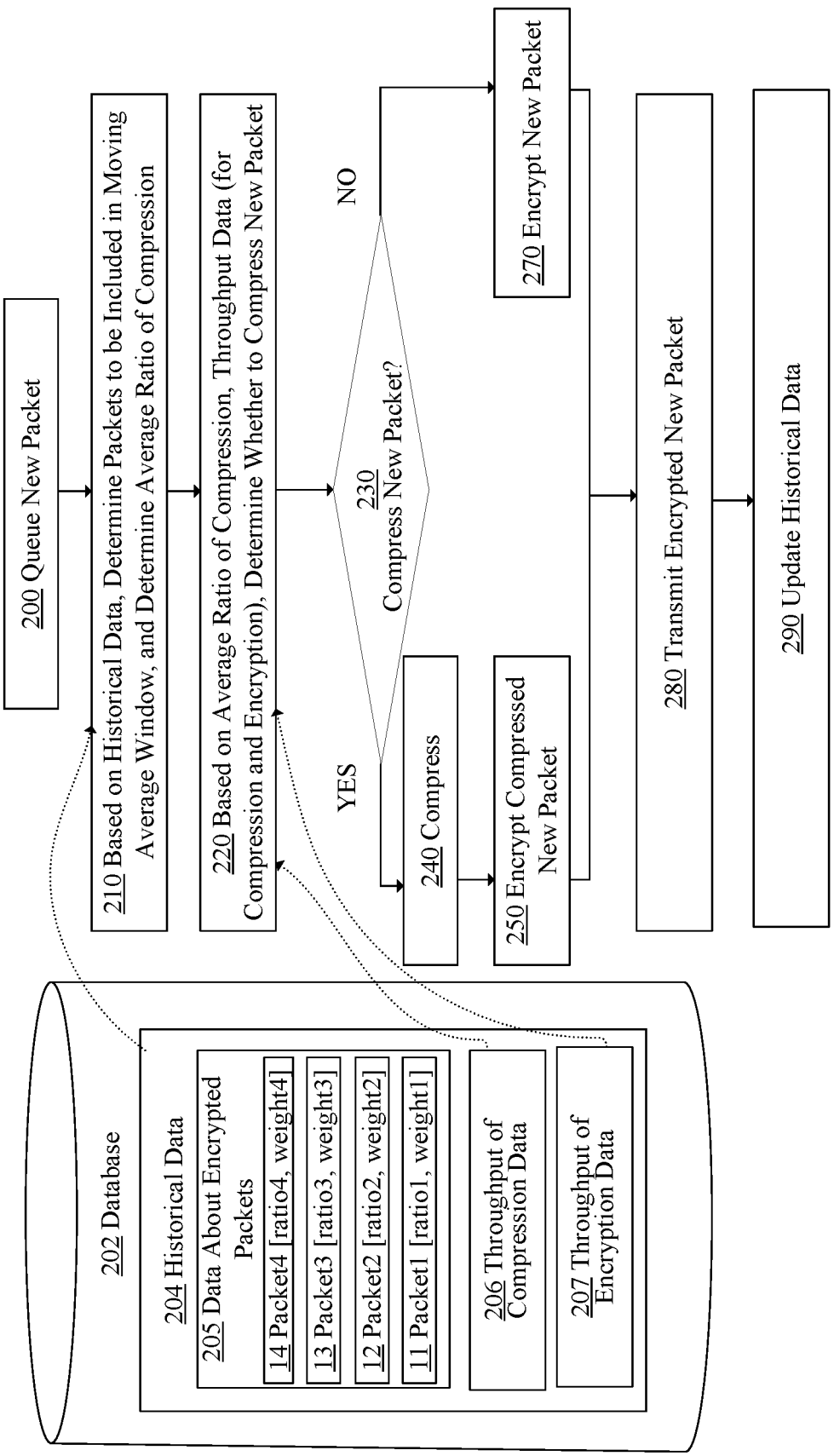
FIG. 2 depicts an example process for an adaptive, performance-oriented, and compression-assisted encryption scheme.

Example Process for Adaptive, Performance-Oriented, and Compression-Assisted Encryption Scheme FIG. 2 depicts an example process for an adaptive, performance-oriented, and compression-assisted encryption scheme. The process described in FIG. 2 allows determining ahead of time whether compressing a data packet would reduce the demand on CPUs. Specifically, it allows determining whether applying compression to a data packet can reduce an overall load on the CPUs.

In an embodiment, an example process described in FIG. 2 is implemented in hypervisor 160. However, in other embodiments, the example process may be implemented in virtual switch 140, or another component that is configured to cooperate with hypervisor 160.

In step 200, a new packet is queued at a virtual port. For example, a new packet may be queued at VP1 or VP2. The queued new packet is not encrypted yet, but it may contain already compressed or encrypted packet data.

In step 210, hypervisor 160 selects a subset of history data 204 that may be used to determine whether the new packet should be compressed. Selecting a particular subset of history data 204 may include determining a count of already processed data packets. For example, if the count is set to four, then the four most-recently encrypted packets will be considered in determining whether the new packet is to be compressed. For simplicity of the description, the count is denoted by N.

Figure 5B:
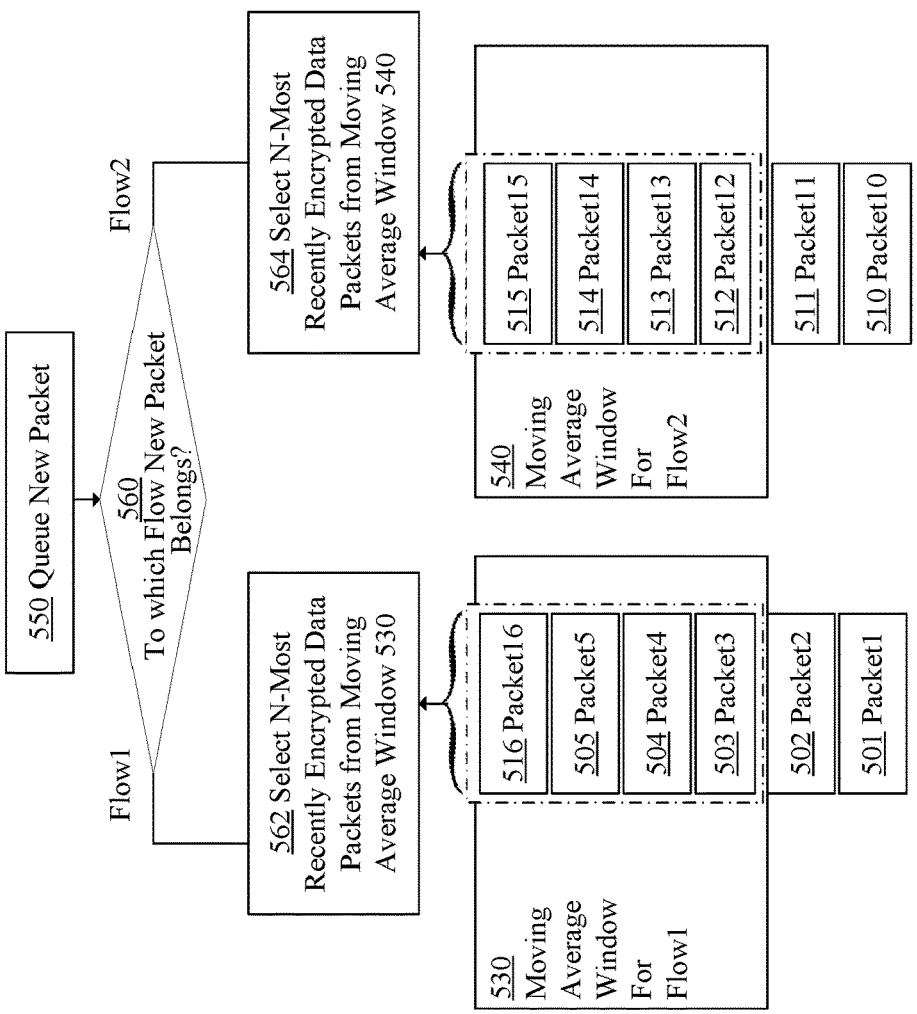
FIG. 5B depicts an example process for selecting N-most recently encrypted packets when a flow classification is implemented.

Once a count N is determined, hypervisor 160 determines N-most recently encrypted data packets. Selection of N-most-recently encrypted data packets depends on, among other things, whether the process includes a data flow analysis. If the process includes the data flow analysis, then hypervisor 160 determines the data flow to which the new packet belongs, and then determines the N-most recently encrypted data packets that belong to that flow. That process is described in detail in FIG. 5B and FIG. 7.

However, if selecting N-most-recently encrypted data packets does not include a data flow analysis, then it is assumed that all already encrypted data packets belong to the same data flow, or that all the flows from the source computing endpoint (e.g., the source VM) are to be considered in the aggregate. In this case, the N-most-recently encrypted data packets are selected regardless of the data flow type.

Selecting N-most recently encrypted data packets includes selecting a moving average window and the packets that belong to that window. The term "moving" denotes that the average window moves, or is updated, each time a new packet is queued. The term "average" denotes that parameter values of the packets included in the window are used to compute an average ratio of compression.

Data packets included in a moving average window may be ordered in a variety of ways. One way is to order the data packets according to the order in which the packets were encrypted. For example, if a packet4 14 was encrypted most recently, packet3 13 was encrypted before packet4 14 was encrypted and so on, then the packets will be ordered as depicted in FIG. 2.

Information 205 about encrypted data packets may include values of various parameters. For example, for each packet, information 205 may include a compression ratio that was achieved by compressing the packet. If the packet has not been compressed, then the ratio of compression for that packet may be set to a default value, such as one.

Other parameter values stored for packets may include weight values. A weight value stored for a data packet represents the importance of the data packet in computing an average ratio of compression. A weight value allows giving a preferential treatment to the more recently encrypted packets. For example, the more recently encrypted packets may have higher weights than the less recently encrypted packets. The process of using the weight values to compute an average ratio of compression is described below with reference to FIG. 3.

Also in step 210, hypervisor 160 computes an average ratio of compression X based on data included in a moving average window. The average ratio of compression X may be computed as an average value of the ratios of the data packets included in the average moving window. Alternatively, an average ratio of compression X may be computed as a weighted average value of the ratios and weights of the data packets included in the average moving window. An average ratio of compression may also be referred to as X(N). An example processes of computing an average ratio of compression X is described below with reference to FIG. 3.

In step 210, hypervisor 160 also accesses throughput of compression data 206 and throughput of encryption data 207. The throughput data is usually generated based on training data in advance, and the collected throughput data is stored in database 202.

Figure 4:
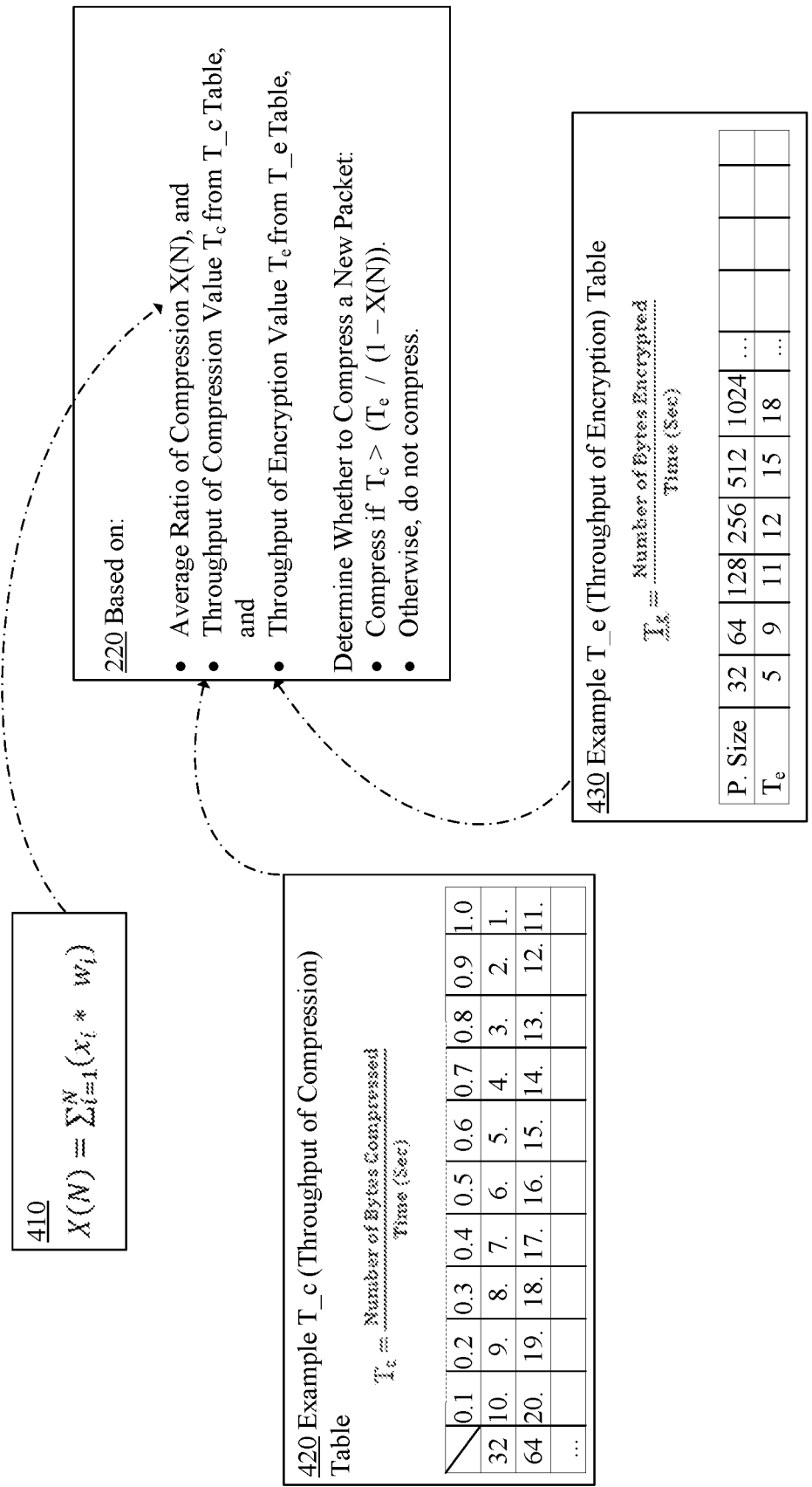
FIG. 4 depicts an example process for determining whether compressing a new data packet can cause reduction of the load on a CPU.

Throughput of compression data 206 represents a measure of compression and may be expressed as a number of bytes of data in a data packet that can be compressed within a given time period and to achieve a given compression ratio. It may include empirical data collected in advance and may be stored in tables indexed using sizes of the data packets and values of the compression ratios. An 420 of throughput of compression data 206 is depicted in FIG. 4.

Throughput of encryption data 207 represents a measure of encryption and may be expressed as a number of bytes of data in a data packet that can be encrypted within a given time period. It may include empirical data collected in advance and may be stored in tables indexed using sizes of the data packets. An example of throughput of compression data 208 is depicted in FIG. 4.

In step 220, based on the average ratio of compression X, a throughput of compression value retrieved for the new data packet, and a throughput of encryption value retrieved from the new data packet, hypervisor 160 determines whether compressing the new packet would potentially reduce the load on CPUs. An example decision process is described below with reference to FIG. 4.

If, in step 230, it is decided that the new data packet is to be compressed, then step 240 is performed. Otherwise, step 270 is performed.

In step 240, the new data packet is compressed. Any compression algorithm that is implemented in hypervisor 160 may be used to compress the new data packet. Examples of compression protocols include IP Payload Compression Protocol (IPComp), and a Microcom Network Protocol (MNP). The compressed new data packet is referred to as a compressed new packet.

In step 250, the compressed new packet is encrypted. Any encryption algorithm that is implemented in hypervisor 160 may be used to encrypt the compressed new packet. Non-limiting examples of encryption algorithm may include symmetric key encryption algorithms such as RC5-CBC, 3DES-EDE-CBC, and AES-GCM.

In step 270, the new data packet is encrypted. Just as in step 250, any encryption algorithm that is implemented in hypervisor 160 may be used to encrypt the new data packet.

Once the new data packet is encrypted, information about the new data packet is added to the historical data 204, and information about the oldest packet in the window, for example, packet1 11 is removed from the window. Thus, although not depicted in FIG. 1, the updated moving average window will include the new data packet, packet4 14, packet3 13 and packet2 12. Updating the average window will continue as new data packets are received.

In step 280, the encrypted new packet is transmitted to for example, any of the uplinks, such as UP1 170 or UP2 172. Then, the encrypted new data packet is transmitted to any of the physical network interface cards, such as PNIC1 180 or PNIC2 182.

Determining an Average Ratio of Compression

Figure 3:
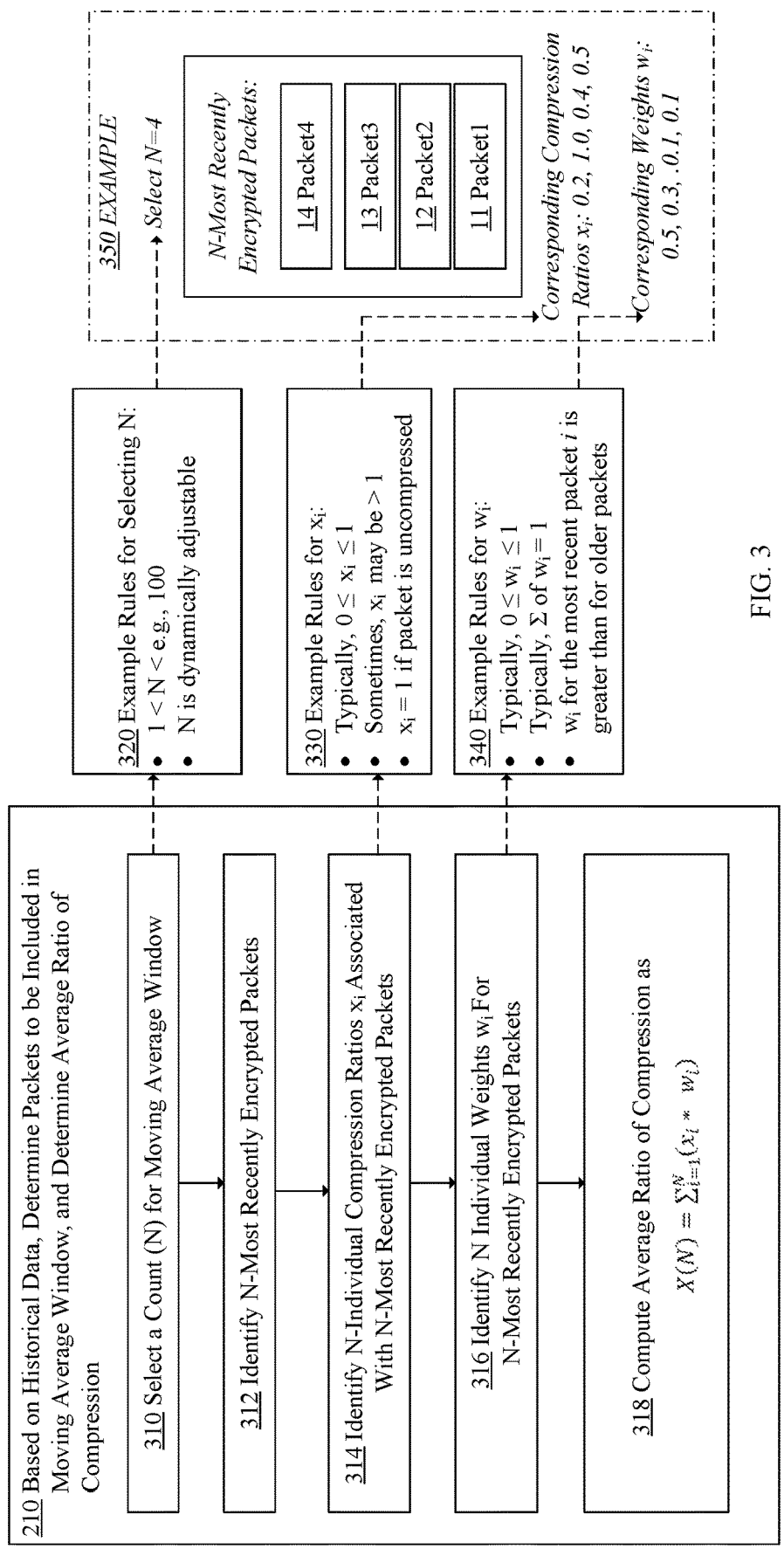
FIG. 3 depicts an example process for determining a weighted average ratio of compression.

FIG. 3 depicts an example process 210 for determining a weighted average ratio of compression. Example 210 depicted in FIG. 3 provides details about step 210 of FIG. 2, and provides a simple illustration of the process in an example 350.

In step 310, a count N is selected for a moving average window. Rules for selecting N depend on an implementation. Example rules 320 for selecting N may state that N is greater than one, but not greater than 100. Example rules 320 may also provide that N can be dynamically adjusted as data traffic is transmitted via virtual switch 140. For example, initially, N may be selected as two as few packets might have been transmitted via virtual switch 140. However, as the data traffic intensifies, N may be increased to four or so. In example 350, N is equal to four.

In step 312, N-most recently encrypted data packets are selected. The selection depends on whether the approach is implemented without a flow classification or with a flow classification. An example process for selecting N-most recently encrypted data packets when a flow classification is not implemented is described in FIG. 5A. An example process of selecting N-most recently encrypted packets when a flow classification is implemented is described in FIG. 5B.

Example 350 depicts four most recently encrypted data packets: a packet4 14, a packet3 13, a packet 2 12, and a packet1 11.

In step 314, N-individual compression ratios $x_i$ that are associated with the N-most recently encrypted packets are identified. Rules for compression ratios $x_i$ depend on an implementation. Example rules 330 for $x_i$ may state that $x_i$ is not less than zero and not greater than one. In some situations, however, a compression ratio may exceed one. This may happen when an original data packet has a high entropy and compressing such a data packet will result in generating a compressed data packet that is larger in size than the original data packet. It may also be assumed that if a data packet is not compressed, then its compression ratio is one.

Example 350 depicts example compression ratios for packets 14-11 as 0.2, 1.0, 0.4, and 0.5, respectively.

In step 316, N-individual weights $w_i$ that are associated with the N-most recently encrypted packets are identified. Rules for weights $w_i$ depend on an implementation. Example rules 340 for identifying $w_i$ may state that $w_i$ is not less than zero and not greater than one. The rules may also state that a sum of the N-individual weights is one. Typically, the $w_i$ for the most recently encrypted packet is greater than weights for the other packets in an average moving window.

Example 350 depicts example weights for packets 14-11 as 0.5, 0.3, 0.1, and 0.1, respectively.

In step 318, an average ratio of compression is computed. An average ratio of compression may be computed using various expressions. For example, in an embodiment wherein the average ratio of compression is a weighted average ratio, then it may be computed using the following expression:

$$X(N) = \Sigma_{i=1}^{N}(x_i * w_i) \quad (1)$$

In expression (1), X(N) denotes a weighted average ratio of compression computed for N-most recently encrypted packets included in a moving average window; N denotes a count of the encrypted data packets included in the moving average window; $x_i$ denotes an individual compression ratio for a data packet i, and $w_i$ denotes an individual weight for a data packet i.

However, in an embodiment wherein an average ratio of compression is not a weighted compression ratio, then X(N) may be computed using the following expression:

$$X(N) = \frac{1}{N} * \sum_{i=1}^{N} (x_i) \quad (2)$$

In expression (2), X(N) denotes an average ratio of compression computed for N-most recently encrypted packets included in a moving average window; N denotes a count of the encrypted data packets included in the moving average window; and $x_i$ denotes an individual compression ratio for a data packet i. Individual weights for the data packet are not included in expression (2). Other methods for computing an average ratio of compression may also be implemented.

Determining Whether to Compress a Data Packet

FIG. 4 depicts an example process 220 for predicting whether compressing a new data packet can cause reduction of the load on CPUs to encrypt the new packet. Example 220 depicted in FIG. 4 provides details about step 220 of FIG. 2.

In step 220, a prediction is derived based on an average ratio of compression X(N), a throughput of compression value $T_c$, and a throughput of compression value $T_e$. X(N) is computed using for example, expression 410. The throughput of compression value $T_c$ is retrieved from for example, a throughput of compression table T_c 420. The throughput of encryption value $T_e$ is retrieved from for example, a throughput encryption table T_e 430. Based on the prediction, hypervisor 160 determines whether compressing a new data packet could decrease the load on CPUs in terms of reducing the load on the CPUs to perform encryption of the new packet. The prediction may be derived using an algorithm described in FIG. 7.

As described in detail below with reference to FIG. 7, the prediction is obtained by comparing $T_c$ with $(T_e/(1-X(N))$. If $T_c$ is greater than $(T_e/1-X(N))$, then compressing the new packet is recommended because compressing the new packet could reduce the overall load on CPUs.

However, if $T_c$ is not greater than $(T_e/(1-X(N))$, then compressing the new packet is not recommended because it most likely will not reduce the overall load on CPUs.

Example throughput of compression table T_c 420 represents a measure of compression. It may be organized as a two-dimensional table that has columns indexed using example compression ratio values, and has rows indexed using example packet size values. It may include empirical data collected in advance. Merely to illustrate a simple example, table T_c 420 in FIG. 4 shows hypothetical values of throughput of compression. The first row in table T_c 420 includes example compression ratio values: 0.1, 0.2, 0.3, 0.4, 0.5, 0.6, 0.7, 0.8, 0.9, and 1.0. The second row in table T_c 420 includes example, hypothetical throughput of compression values obtained for an example data packet that was 32 bytes long; they include 10, 9, 8, 7, 6, 5, 4, 3, 2, and 1. The third row in table T_c 420 includes example, hypothetical throughput of compression values obtained for an example data packet that was 64 bytes long: they include 20, 19, 18, 17, 16, 15, 14, 13, 12, and 11.

Example throughput of encryption table T_e 430 represents a measure of encryption. It may be organized as a one-dimensional table that has throughput of encryption values indexed using example packet size values. It may include empirical data collected in advance and may be stored in tables indexed using sizes of data packets. The values provided in table T_e 430 in FIG. 4 are provided merely to illustrate an example. The first row in table T_e 430 includes example packet sizes expressed in bytes: they include 32, 64, 128, 256, 512, 1024 and so on. The second row in table T_e includes example, hypothetical throughput of encryption values obtained for the data packets having sizes indicated in the first row. The example, hypothetical throughput of encryption values for such data packets are: 5, 9, 11, 12, 15, 18 and so on.

Figure 5A:
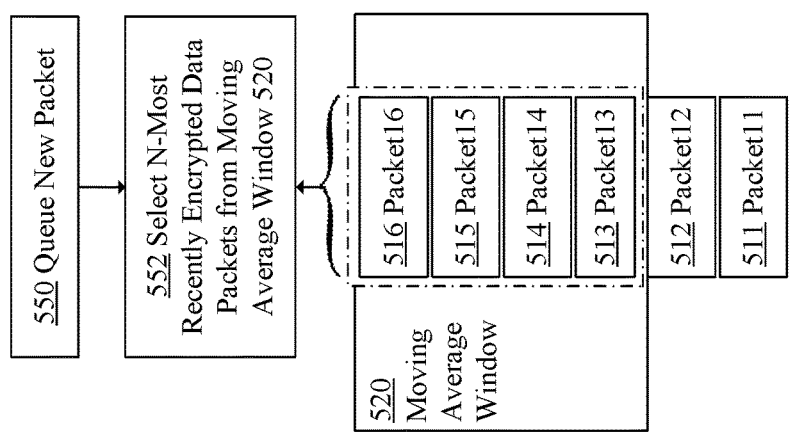
FIG. 5A depicts an example process for selecting N-most recently encrypted packets when a flow classification is not implemented.

Selection of N-Most Recently Encrypted Packets when a Flow Classification is not Implemented FIG. 5A depicts an example process for selecting N-most recently encrypted packets when a flow classification is not implemented. In the depicted example, it is assumed that most of data packets from a particular source endpoint have similar entropy, and that most of data packets belong to the same data flow.

In step 550, a new data packet is queued at an ingress port to the virtual switch. It is assumed that the new data packet has entropy characteristics similar to entropy characteristics of the previously queued packets.

In step 552, N-most recently encrypted data packets are selected from a moving average window 520. Moving average window 520 may include the packets that have been encrypted, and/or the packets that have been first compressed and then encrypted. In fact, it is possible that moving average window 520 includes only data packets that have been only encrypted, but never compressed. It is also possible that moving average window 520 includes only data packets that have been both compressed and encrypted.

In the example depicted in FIG. 5A, moving average window 520 includes four most recently encrypted packets. These packets are a packet16 516, a packet15 515, a packet14 514, and a packet13 513. A packet12 512 and a packet11 511 are not included in moving average window 520 as they w removed from moving average window 520.

Examples of Different Data Flows

In some cases, a new data packet is part of traffic that happened to switch from communicating a high-entropy traffic flow, such as a transfer of an already-compressed file, to a low-entropy traffic flow, such as a transfer of an uncompressed ASCII file. This may occur even if the traffic flow is communicated via the same TCP or UDP communications connection.

However, entropy characteristics are usually measured qualitatively, not quantitatively. Therefore, it may be difficult to determine whether the traffic entropy characteristics have changed or not; especially, since the changes may be gradual and continuous.

One of the solutions includes separating the low-entropy traffic flow, which is most likely a good candidate for applying compression, from the high-entropy traffic flow, which is most likely a poor candidate for applying compression. In addition, separate historical data and a separate average moving window may be maintained for the low-entropy traffic flow and separate historical data and a separate average moving window may be maintained for the high-entropy traffic flow. The implementation approaches for separating the traffic flows may vary and one of many examples is described below.

Selection of N-Most Recently Encrypted Packets when a Flow Classification is Implemented An adaptive approach presented herein may be applied at different levels of data traffic granularity. Applying the approach at a higher level of granularity allows achieving a better decision accuracy and a better performance gain. Defining a higher level of granularity may include dividing data traffic into data flows based on the data entropy.

Examples of traffic flows that contain high-entropy information include already compressed data (MPEG, JPEG, ZIP, DEFLATE, etc.), already encrypted data (PGP, S/MIME, WebCrypto, TLS), high-entropy images, and the like. Examples of traffic flows that contain low-entropy information include ASCII plain text of HTML, JavaScript data, and the like. Typically, if the flow starts as a high-entropy flow or starts as a low-entropy flow, it usually persists with the same amount of entropy for the duration of the flow. However, it is possible that a single communications connection will switch back and forth between a high entropy flow and a low entropy flow. This may happen when for example different entropy objects are transmitted within the same traffic flow. Example protocols that may support that include the HTTP/1.1 with pipelining and HTTP/2.

In an embodiment, an adaptive approach includes dividing data traffic into two or more types of data traffic. Non-limiting examples of data flows include a flow that carries text traffic and hence includes low entropy data packets, and a flow that carries video-based traffic, such as already MPEG4 encoded/compressed data packets, and therefore holds high entropy. Applying the same approach to the aggregated traffic that comprises both traffic flows is undesirable because the flows have different entropy characteristics. To achieve satisfactory results, the queued data traffic is divided into the respective data flows, and the approach presented herein is applied to each of the flows separately.

Separating queued data traffic into data flows may be implemented using various filtering mechanisms. One of the mechanisms may utilize information included in headers of the queued data packets. For example, upon queueing a new data packet, a header of the new data packet may be parsed to identify information that may be useful in determining the traffic flow to which the new data packet belongs. Non-limiting examples of header information that may be useful in filtering data traffic into separate flows is depicted in FIG. 6.

Figure 6:
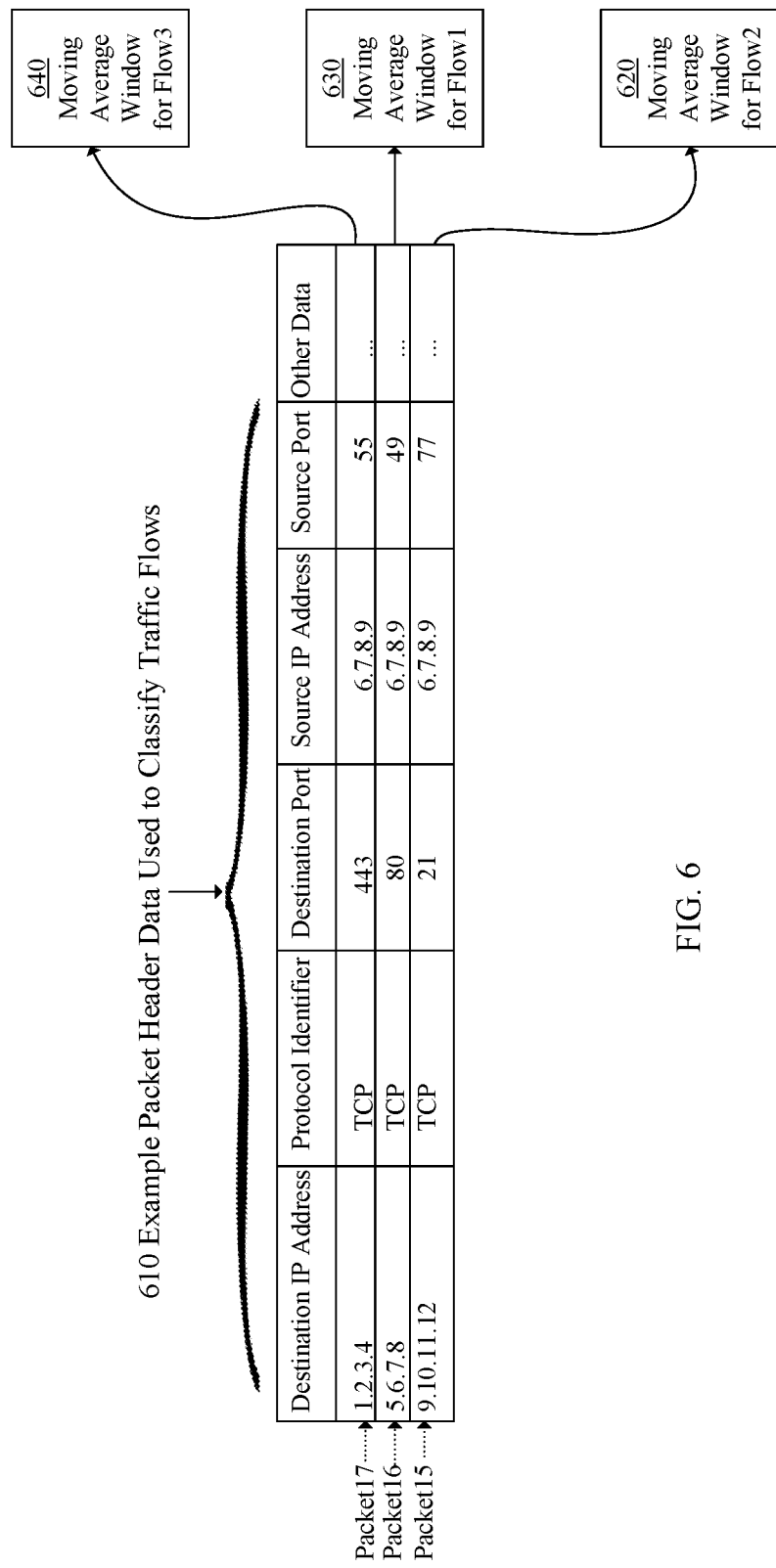
FIG. 6 depicts an example process for classifying traffic flows.

FIG. 6 depicts an example process for classifying traffic flows. In the depicted example, three types of traffic flows are identified: a flow1, a flow2, and a flow3. A non-limiting example of packet header data 610 that may be used to classify traffic flows includes a destination IP address, a protocol identifier, a destination port, a source IP address, and a source port. Other header information may also be used to filter data traffic into different traffic flows.

The example depicted in FIG. 6 is provided to merely illustrate the concept, and shows that a header for a packet17 comprises a destination IP address 1.2.3.4, a protocol identifier TCP, a destination port 443, a source IP address 6.7.8.9, and a source port 5. Headers for a packet16 and a packet15 comprise similar information, except different destination IP addresses, different destination ports and different source ports. Based on the header information of the respective packets, the packet17 is included in a moving average window 640 for the flow3, the packet16 is included in a moving average window 630 for the flow2, and the packet15 is included in a moving average window 620 for the flow1.

Once the flows are identified, the presented approach is applied to each of the flows separately.

Example Algorithm for Determining Whether to Compress a Data Packet to Cause Reduction of a CPU In an embodiment, an approach allows predicting, without actually compressing and then encrypting a data packet, whether the CPU load to encrypt the compressed packet could be lower than the CPU load required to encrypt the uncompressed data packet. The approach uses historical throughput data because, at the time when the prediction is derived, a CPU load required to compress the packet and a CPU load required to encrypt the compressed packet or the original packet are unknown.

FIG. 7 depicts an example algorithm for determining whether compressing a new data packet can cause reduction of a CPU load. The example algorithm is described by providing assumptions 710, objectives 720, a problem statement 730, and a solution 740.

Assumptions 710 include the following assumptions:

X represents a compression ratio. Generally, $0<X<1$. However, $X>1$ for certain data packets and for certain compression algorithms.

S denotes an original packet size.

S' denotes a compressed packet size.

Tc denotes a throughput of compression. Generally, Tc depends at least on a packet size and entropy density characteristics carried in the packet.

Te denotes a throughput of encryption. Generally, Te depends on a packet size.

Le denotes a CPU load on encryption of the original packet. Le=S/Te.

Lc denotes a CPU load on compression of the original packet. Lc=S/Tc.

Le' denotes a CPU load on encryption of the compressed packet. Le'=S'/Te.

Objectives 720 include determining whether a sum of a CPU load of compression and a CPU load of encryption of the compressed packet is less than a CPU load of encryption only (no compression). This may be denoted using the following expression:

$$Lc+Le'<Le \quad (3)$$

Problem Statement 730 indicates that determining whether Lc+Le'<Le is difficult without actually compressing and then encrypting the data packet, and without actually encrypting the uncompressed data packet.

Solution 740 provides a sequence of algebraic rewrites of expression (3):

$$=>S/Tc+S'/Te<S/Te$$

$$=>S/Tc<(S-S')/Te$$

$$=>Tc>Te*S/(S-S') \text{(given that } S>S'\text{,when } S<=S' \text{ we will not do compression due to lack of benefit)}$$

$$=>Tc>Te/(1-X) \quad (4)$$

Therefore, instead of using expression (3), the solution may be based on expression (4). Expression (4) may be used as an adaptive decision criterion for determining whether to apply compression to a data packet or not. It may be used to identify situations in which compression can improve the CPU-bounded performance in an adaptive way.

To resolve X in expression (4), a weighted moving average window determined based on historical data of the already processed/encrypted packets may be used. For example, the window may include information for N-most recently encrypted data packets, and the information may include compression ratios for the N packets. Therefore, expression (4) may be evaluated based on the compression ratios of past N packets, and the need to compress newly queued packets can be avoided.

As described above, the data packets that have not been compressed may have a ratio of compression set in an average moving window to one. In case that recent packets are not compressed, a compression trial may start after a certain threshold of consecutive compression misses has been reached. The certain threshold may be selected in advance or dynamically adjusted to meet certain compression ratio statistics. However, when the certain threshold of consecutive compression misses has not been reached, a default compression ratio of one may be assigned to the already encrypted packets.

To resolve Tc and Te in expression (4), compression tables, such as T_c 420 in FIG. 4, and encryption throughput tables, such as T_e 430 in FIG. 4, may be populated for different packet sizes (and potentially for different compression ratios) at an initialization stage. The tables may be populated by executing compression and encryption speed tests on test data packets and on real hardware. Thus, to resolve Tc in expression (4), a size of the newly queued packet and an average ratio of compression X are determined, and used to retrieve the specific Tc value from the compression table T_c. To resolve Te in expression (4), the size of the newly queued packet is determined and used to retrieve the specific Te value from the encryption table T_e.

Benefits of Example Embodiments

In an embodiment, the approach allows determining whether applying compression to a data packet before the packet is encrypted can reduce an overall CPU load. The approach allows predicting, without actually compressing and then encrypting the data packet, whether the CPU load to be used to encrypt an uncompressed packet could be reduced if the packet was compressed first and encrypted next.

In an embodiment, an approach for determining whether to compress a data packet before the packet is encrypted uses historical throughput data. The historical throughput data is used because the approach derives a prediction without actually compressing and then encrypting a compressed packet.

The approach may be implemented on a transmission (Tx) side of the data path as a packet encryption is typically performed on the Tx side. For example, the approach may be implemented as an enhanced functionality of a hypervisor on the Tx-side.

Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for an adaptive, performance-oriented, and compression-assisted encryption scheme implemented on a host computer to adaptively improve utilization of CPU resources, the method comprising:

determining a size of a new data packet;

based on historical data, determining an average ratio of compression for a plurality of already encrypted data packets;

based on the average ratio of compression and the size of the new data packet, predicting whether compressing the new data packet will reduce overall load on CPU resources;

in response to determining that compressing the new data packet will reduce the overall load on the CPU resources, generating a compressed new data packet by compressing the new data packet; and in response to determining that a throughput of compression value exceeds a threshold, encrypting the compressed new data packet after the compressing.

2. The method of claim 1, further comprising determining a throughput of compression value and a throughput of encryption value based on the size of the new data packet, and wherein predicting whether compressing the new data packet will reduce the overall load on the CPU resources comprises predicting whether the throughput of compression value exceeds a threshold based on the throughput of encryption value.

3. The method of claim 1, further comprising:
further comprising determining a throughput of compression value and a throughput of encryption value based on the size of the new data packet.

4. The method of claim 1, further comprising:
upon receiving the new data packet, determining whether the new data packet belongs to a particular traffic flow, wherein determining whether the new data packet belongs to the particular traffic flow is based on content of a packet header of the new data packet; and
in response to determining that the new data packet belongs to the particular traffic flow, determining a particular subset of the historical data, and selecting the plurality of already encrypted data packets from the particular subset of the historical data.

5. The method of claim 1, wherein the throughput of compression value is retrieved from a throughput of compression table that is indexed using a size of a data packet and an estimated compression ratio;
wherein the throughput of compression value represents a count of bytes compressed within a certain time period for a data packet that has the size of the new data packet and for the average ratio of compression;
wherein the throughput of encryption value is retrieved from a throughput of encryption table that is indexed using a size of a data packet;
wherein the throughput of encryption value represents a count of bytes encrypted within a certain time period for a data packet that has the size of the new data packet;
wherein the throughput of compression table and the throughput of encryption table are generated based on training data; and
wherein the historical data is collected based on the training data.

6. The method of claim 1, wherein the average ratio of compression is computed as a weighted average ratio of compression.

7. The method of claim 1, wherein the throughput of compression value depends on entropy density characteristics carried in the new data packet.

8. One or more non-transitory computer-readable media comprising computer executable instructions that, when executed by one or more processors, cause the one or more processors to perform the following:
determining a size of a new data packet;
based on historical data, determining an average ratio of compression for a plurality of already encrypted data packets;
based on the average ratio of compression and the size of the new data packet, predicting whether compressing the new data packet will reduce overall load on CPU resources; and in response to determining that compressing the new data packet will reduce the overall load on the CPU resources, generating a compressed new data packet by compressing the new data packet; and in response to determining that a throughput of compression value does not exceed a threshold, encrypting the new data packet before compressing the new data packet.

9. The one or more non-transitory computer-readable media of claim 8, wherein the computer executable instructions further cause the one or more processors to perform determining a throughput of compression value and a throughput of encryption value based on the size of the new data packet, and wherein predicting whether compressing the new data packet will reduce the overall load on the CPU resources comprises predicting whether the throughput of compression value exceeds a threshold based on the throughput of encryption.

10. The one or more non-transitory computer-readable media of claim 8, wherein the one computer executable instructions further cause the one or more processors to perform:
determining a throughput of compression value and a throughput of encryption value based on the size of the new data packet.

11. The one or more non-transitory computer-readable media of claim 8, wherein the one computer executable instructions further cause the one or more processors to perform:
upon receiving the new data packet, determining whether the new data packet belongs to a particular traffic flow, wherein determining whether the new data packet belongs to the particular traffic flow is based on content of a packet header of the new data packet; and
in response to determining that the new data packet belongs to the particular traffic flow, determining a particular subset of the historical data, and selecting the plurality of already encrypted data packets from the particular subset of the historical data.

12. The one or more non-transitory computer-readable media of claim 8, wherein the throughput of compression value is retrieved from a throughput of compression table that is indexed using a size of a data packet and an estimated compression ratio;
wherein the throughput of compression value represents a count of bytes compressed within a certain time period for a data packet that has the size of the new data packet and for the average ratio of compression;
wherein the throughput of encryption value is retrieved from a throughput of encryption table that is indexed using a size of a data packet;
wherein the throughput of encryption value represents a count of bytes encrypted within a certain time period for a data packet that has the size of the new data packet;
wherein the throughput of compression table and the throughput of encryption table are generated based on training data; and wherein the historical data is collected based on the training data.

13. The one or more non-transitory computer-readable media of claim 8, wherein the average ratio of compression is computed as a weighted average ratio of compression.

14. The one or more non-transitory computer-readable media of claim 8, wherein the throughput of compression value depends on entropy density characteristics carried in the new data packet.

15. A system comprising:

a host computer;

one or more central processing unit (CPU) resources;

one or more processors; and a memory comprising computer-executable instructions that, when executed by the one or more processors, cause the one or more processors to perform the following:

determining a size of a new data packet;

based on historical data, determining an average ratio of compression for a plurality of already encrypted data packets;

based on the average ratio of compression and the size of the new data packet, predicting whether compressing the new data packet will reduce overall load on CPU resources;

in response to determining that compressing the new data packet will reduce the overall load on the CPU resources, generating a compressed new data packet by compressing the new data packet; and in response to determining that a throughput of compression value exceeds a threshold, encrypting the compressed new data packet after the compressing; or in response to determining that a throughput of compression value does not exceed a threshold, encrypting the new data packet before compressing the new data packet.

16. The system of claim 15, wherein the one computer executable instructions further cause the one or more processors to perform determining a throughput of compression value and a throughput of encryption value based on the size of the new data packet, and wherein predicting whether compressing the new data packet will reduce the overall load on the CPU resources comprises predicting whether the throughput of compression value exceeds a threshold based on the throughput of encryption.

17. The system of claim 15, wherein the one computer executable instructions further cause the one or more processors to perform:

determining a throughput of compression value and a throughput of encryption value based on the size of the new data packet.

18. The system of claim 15, wherein the one computer executable instructions further cause the one or more processors to perform:

upon receiving the new data packet, determining whether the new data packet belongs to a particular traffic flow, wherein determining whether the new data packet belongs to the particular traffic flow is based on content of a packet header of the new data packet; and in response to determining that the new data packet belongs to the particular traffic flow, determining a particular subset of the historical data, and selecting the plurality of already encrypted data packets from the particular subset of the historical data.

19. The system of claim 15, wherein the throughput of compression value is retrieved from a throughput of compression table that is indexed using a size of a data packet and an estimated compression ratio;

wherein the throughput of compression value represents a count of bytes compressed within a certain time period for a data packet that has the size of the new data packet and for the average ratio of compression;

wherein the throughput of encryption value is retrieved from a throughput of encryption table that is indexed using a size of a data packet;

wherein the throughput of encryption value represents a count of bytes encrypted within a certain time period for a data packet that has the size of the new data packet;

wherein the throughput of compression table and the throughput of encryption table are generated based on training data; and wherein the historical data is collected based on the training data.

20. The system of claim 15, wherein the average ratio of compression is computed as a weighted average ratio of compression.

* * * * *